Figure 1:
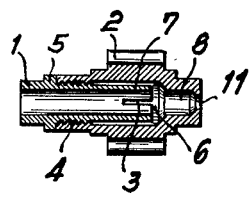

April 25, 1961 E. HOFFMEISTER 2,981,545
CLAMPING DEVICES FOR DENTAL TOOLS
Filed Dec. 5, 1958 3 Sheets-Sheet 1

ERICH HOFFMEISTER
INVENTOR

April 25, 1961  E. HOFFMEISTER  2,981,545
CLAMPING DEVICES FOR DENTAL TOOLS
Filed Dec. 5, 1958  3 Sheets-Sheet 3

ERICH HOFFMEISTER
INVENTOR

Fisher, Christen & Dodson
attys.

United States Patent Office 2,981,545
Patented Apr. 25, 1961

2,981,545

CLAMPING DEVICES FOR DENTAL TOOLS

Erich Hoffmeister, Biberach, Riss, Germany, assignor to Alois Kaltenbach and Erich Hoffmeister, partners of Kaltenbach & Voigt, Biberach/Riss, Germany Filed Dec. 5, 1958, Ser. No. 778,355

Claims priority, application Germany Dec. 12, 1957

7 Claims. (Cl. 279—41)

This invention relates to clamping devices for dental tools.

Dental tools, such as burrs, grinding wheels and the like, can be clamped in straight or angle dental handpieces by collet chucks, and for securing the tools in the collet chuck there is provided a special tightening mechanism which is e.g. in the form of a clamping nut and which can be operated to cause the individual jaws of the collet chuck to be pressed fast against the shank of the tool.

More particularly in the case of angle handpieces, it is also known for the tool shank to be inserted in an upper cog of the handpiece without the use of a collet chuck and to secure the said shank against displacement in the axial sense by means of a lever-operated pivotable catch, a slide or the like, which engages in an annular groove in the tool shank.

Whereas the known collet chucks require special tightening mechanisms, the axial securing of tools inserted in the upper cog of angle handpieces requires lever-operated pivotable catches, slides or the like, i.e. additional component parts.

A further consideration is that in using lever-operated pivotable catches, slides or the like for securing the tool against axial displacement, special tools are required since the shanks in this case must be provided with an annular groove, whereas if collet chucks are used the shanks can be made completely cylindrical.

An object of the invention is to devise an improved clamping device for dental tools, which is adapted to be used both for straight and also for angle handpieces.

The clamping device according to the invention comprises a clamping sleeve of elastic material which can be inserted in a hollow driving shaft or in an upper cog of a dental handpiece and which is formed at one end at least, preferably at the end intended to face the driving shaft or upper cog, with a plurality of slits defining elastic tongues which are bent inwards in order to permit the requisite clamping effect on a tool shank. The clamping sleeve can be pressed or screwed into the hollow driving shaft or into the upper cog.

With the arrangement of the elastic tongues on the end of the sleeve facing the driving shaft or upper cog, the clamping sleeve comprises an external collar which so limits the introduction of the sleeve into the hollow driving shaft or into the upper cog that the ends of the elastic tongues do not reach the bottom of the recess in the driving shaft or upper cog.

It is also expedient for the wall of the clamping sleeve to be reduced in thickness at least over the length of the elastic tongues in order thereby to prevent under all circumstances the elastic tongues from being pressed against the surrounding walls of the driving shaft or upper cog when the tool shank is inserted.

The use of the clamping device makes it possible not only to dispense with the use of the special tightening mechanism required for collet chucks and also all lever-operated pivotable catches, slides and the like, i.e. all additional components, but also to use clamping sleeves of like dimensions in straight handpieces and angle handpieces and consequently to use like tools with like shanks.

It has been found that with the high-speed dental instruments which are now being used more and more, the inherently elastic clamping sleeves according to the invention are fully adequate for securing reliably any tools inserted therein, since the necessary working pressure which is applied when the tools are used has to be reduced more and more.

Figure 2:
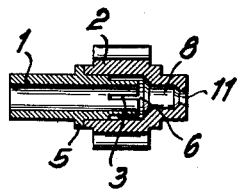
Figure 3:
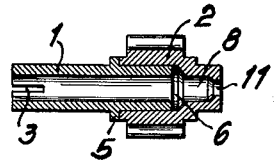
Figure 4:
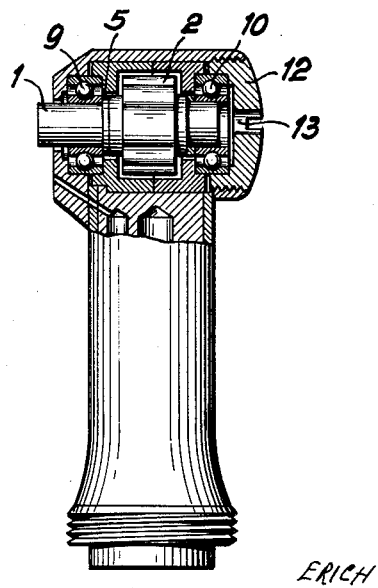
Figure 5:
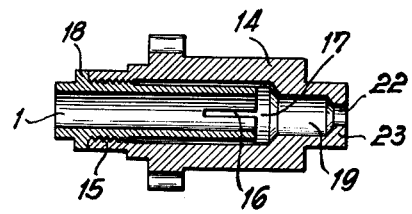
Figure 6:
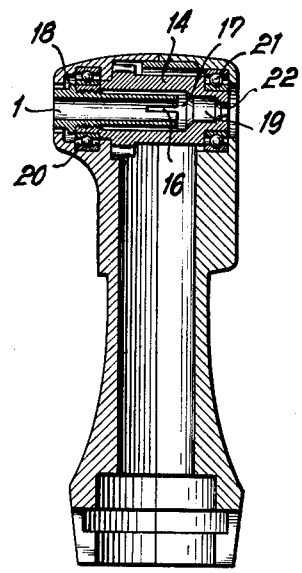
Figure 8:
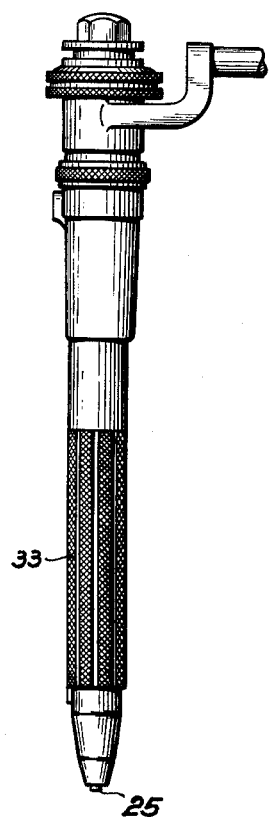
Figure 7:
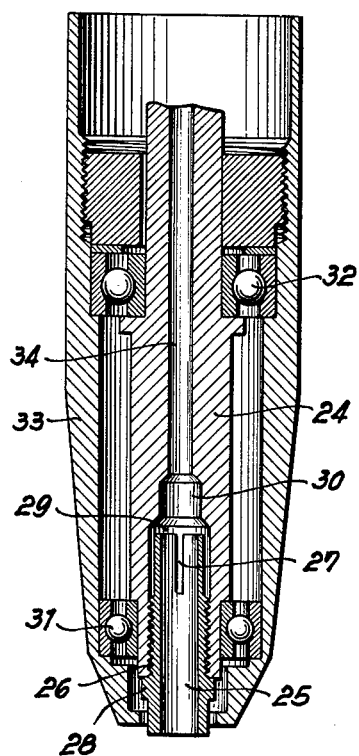

For a better understanding of the invention and to show how it may be carried into effect, several forms of embodiment thereof will now be described, by way of example, with reference to the accompanying drawings, in which:

Figure 1 is a longitudinal sectional view of one form of embodiment of the clamping device in conjunction with the rotor of an air turbine, Figure 2 is a longitudinal sectional view illustrating a modification of the embodiment of Figure 1, Figure 3 is a longitudinal sectional view of a further modified form of embodiment, Figure 4 illustrates the use of one of the forms of embodiment according to Figures 1 to 3 in an angle handpiece comprising a turbine arranged in the handpiece head and shown partly in longitudinal section and partly in elevation, Figure 5 is a longitudinal sectional view of the clamping device in a form of embodiment according to Figure 1, in conjunction with an upper cog for angle handpieces, Figure 6 is a view on a reduced scale, also in longitudinal section, of the mounting of the clamping device with upper cog according to Figure 5 in the longitudinally divided head of an angle handpiece, Figure 7 is a longitudinal sectional view on a larger scale of a clamping device according to Figure 1 built into the front end of a driving shaft of a straight handpiece, and Figure 8 is a side elevational view of the entire handpiece, constructed at its front end in the manner shown in Figure 7.

In the form of embodiment according to Figure 1, the clamping device comprises a clamping sleeve 1 formed of elastic material. This clamping sleeve 1 is provided with a plurality of slits 3 which are arranged about the periphery of that end of the sleeve which is inserted in the hollow shaft of a turbine rotor 2, the elastic tongues formed by the slits being bent inwards slightly towards the axis of the clamping sleeve. The clamping sleeve 1 is screwed into the front threaded end 4 of the hollow shaft of the turbine rotor 2. An external collar 5 on the clamping sleeve limits the extent to which the clamping sleeve can be screwed into the hollow shaft of the rotor 2, in such manner that a free space 6 is left between the slit end of the clamping sleeve and the shaft of the turbine rotor 2. As shown in Figure 1, the wall portion 7 of the clamping sleeve extending from the slit end down to the threaded portion, is of reduced thickness, thereby facilitating the elastic movement of the tongues and avoiding pressure of these tongues against the inner wall of the hollow shaft of the turbine rotor 2 when the tool shank is inserted in the clamping device.

The form of embodiment according to Figure 2 corresponds substantially to the form of embodiment according to Figure 1 except for the difference that the clamping sleeve 1 is pressed up to the collar 5 into the hollow shaft of the turbine rotor. Here also, a free space 6 is provided between the end of the slit clamping sleeve and the hollow shaft of the turbine rotor, and the wall of the clamping sleeve is also reduced in thickness over the length of the slits 3.

In the form of embodiment according to Figure 3, the clamping sleeve 1 is provided at its free end remote from the turbine rotor 2 with a plurality of peripherally distributed slits 3 defining tongues which are also bent inwards slightly towards the axis of the clamping sleeve as in Figure 1. The clamping sleeve is also pressed into the hollow shaft of the turbine rotor 2 so far that the collar 5 abuts against the front end face of the hollow shaft of the turbine rotor 2. In this way the result is here again achieved that a free space 6 is left between the pressed-in end of the clamping sleeve and the hollow shaft of the turbine rotor 2.

The tool shank inserted in the clamping device according to Figures 1 to 3 extends through the entire clamping sleeve 1 and projects somewhat into the bore 8 of the shaft of the turbine rotor 2, the bore 8 corresponding to the internal diameter of the clamping sleeve 1. The tool shank is held fast by the elastic tongues of the clamping sleeve, which tongues are formed between the slits 3 of the said clamping sleeve and which, when the tool shank is inserted, are displaced or bent outwards slightly whilst simultaneously producing the elastic clamping effect for which they are intended.

Figure 4 illustrates an angle handpiece head having an air turbine arranged in the head, the shaft of the said turbine being mounted in known manner in the head by means of ball bearings 9 and 10. In the example of embodiment illustrated in Figure 4, the form of embodiment of the clamping device according to Figure 2 has been used. Of course, a clamping device according to Figure 1 or Figure 3 could be used in a similar manner.

The end of the hollow shaft of the turbine rotor 2 in the forms of embodiment according to Figures 1 to 3 is provided with a hole 11. Likewise, the closure nut 12 (Figure 4) inserted in the rear end of the head, is formed axially of the head with a hole 13 so that the tool shank inserted in the clamping device can be pushed out of the clamping sleeve in a simple fashion by means of a hand-operated driving tool inserted through the holes 13 and 11.

Figure 5 shows a clamping sleeve 1 which is constructed in accordance with Figure 1. This clamping sleeve is inserted in the upper cog 14 which is formed with an appropriate bore, and the clamping sleeve is in fact screwed into said upper cog, the bore in the cog being provided at its front end with screw-threading 15. The clamping device is provided at its end engaging in the bore of the upper cog, with a plurality of longitudinal slits 16 which are distributed about the periphery of the said end, and the wall of the clamping sleeve is of reduced thickness down to the end of the screw-threading 15. Provided between the slit end of the clamping sleeve and the reduced-diameter bore in the upper cog 14 is an adequate clearance 17 which is ensured by the external collar 18 of the clamping sleeve which bears against the front end face of the upper cog 14.

The tool shank inserted in the clamping device according to Figure 5 extends through the clamping sleeve and projects into the reduced-diameter bore 19 of the upper cog 14 as far as the rear end thereof, the diameter of the bore 19 corresponding to the internal diameter of the clamping sleeve 1. The tool is clamped fast in the clamping sleeve by the elastic tongues left between the longitudinal slits 16 in the clamping sleeve owing to the fact that these elastic tongues, which are bent slightly inwards towards the axis of the clamping sleeve when no tool shank is inserted in the latter, are displaced or bent outwardly and produce an elastic clamp-effect when a tool shank is inserted.

Figure 6 illustrates a longitudinally divided angle handpiece head in which is inserted a clamping device according to Figure 5 with its associated upper cog 14. The upper cog 14 is mounted by ball bearings 20, 21 in the two halves of the angle handpiece head.

With this form of embodiment also, the tool shank inserted in the clamping device and in the upper cog 14 can be ejected from the clamping device by means of a hand-operated driving tool which can be inserted through the hole 22 in the rear end 23 of the upper cog 14.

Figures 7 and 8 illustrate the mounting of a clamping device according to Figure 5 in the front end of a driving shaft 24 in a straight handpiece, said front end being provided with an axial bore. The clamping sleeve 25 is screwed into the axial bore at the front end of the driving shaft 24 at 26. The end of the clamping sleeve 25 engaging in the axial bore is provided with a plurality of longitudinal slits 27 for forming elastic tongues which are bent slightly inwards towards the axis of the clamping sleeve. Here also, an external collar 28 on the clamping sleeve 25 ensures that a free clearance 29 remains between the end of the clamping sleeve 25 provided with slits 27 and the reduced-diameter bore 30 of the driving shaft. The walls of the clamping sleeve are reduced in thickness, by reducing the external diameter of the sleeve, over the length of the longitudinal slits 27. The tool shank inserted in the clamping sleeve engages through the entire clamping sleeve and enters also the reduced-diameter bore 30 as far as the end thereof, and here again the tool shank is clamped fast by the bending-open of the elastic tongues which are situated between the longitudinal slits 27. In the form of embodiment illustrated in Figure 7, the driving shaft 24 is rotatably supported at its front end by ball bearings 31 and 32 in the sleeve 33 which constitutes the grip of the instrument. The driving shaft 24 is formed throughout its entire length as far as the rear end of the instrument as shown in Figure 8, with an axial longitudinal bore 34 so that, with this form of embodiment also, the tool shank inserted in the clamping sleeve can be ejected therefrom by a hand-operated driving tool inserted through the bore 34 from the rear end of the instrument.

Of course, in all of the aforedescribed embodiments, the tools could also be removed from the clamping device by means of a pincers-like tool gripping the tool shank which projects from the instrument, so that by pulling on the tool the shank can be drawn out of the clamping device. In this event it is expedient for the jaws of the pincers-like tool to be covered with an elastic material.

I claim:

1. A member for securing a dental tool shaft to the rotating elements of a dental handpiece comprising, a sleeve of elastic material, elastic clamping tongues on at least one end of said sleeve, said clamping tongues in their unstressed condition bent radially inwardly an amount to define a cross-sectional area therebetween less than the cross-sectional area of said dental tool shaft, whereby when said shaft is inserted between said tongues said tongues will be forced outwardly and exert a gripping pressure on said shaft.

2. The member as defined in claim 1 wherein said sleeve is secured to said rotating elements by means of a press fit.

3. A clamping sleeve for dental tools comprising a clamping sleeve of elastic material for engagement in a driving member of a dental handpiece, said clamping sleeve having at one end at least thereof a plurality of slits defining elastic tongues, said tongues bent radially inwardly, such that a dental tool inserted therebetween will be securely held by said tongues.

4. A clamping device as defined in claim 3, wherein screw means on said clamping sleeve enable said sleeve to be screwed into engagement with said driving member.

5. A clamping device as defined in claim 3, wherein said driving member has a recess to receive said dental tool, and said elastic tongues are disposed at that end of said clamping sleeve facing the bottom of said recess, an external collar on said sleeve for limiting the insertion of the sleeve into said recess whereby the inserted end of said sleeve does not reach to the bottom of said recess.

6. A clamping device according to claim 3, wherein the wall of said clamping sleeve is of reduced thickness at least over the length of the elastic tongues.

7. A clamping device as defined in claim 3, wherein said driving member comprises a hollow driving shaft of said dental handpiece.

References Cited in the file of this patent

UNITED STATES PATENTS

| | | |
|---|---|---|
| 649,642 | Ludwig | May 15, 1900 |
| 1,458,293 | Hinchey | June 12, 1923 |
| 1,957,235 | Simpson | May 1, 1934 |
| 2,069,775 | Rich | Feb. 9, 1937 |
| 2,741,482 | Abramoska | Apr. 10, 1956 |
| 2,879,594 | Massen | Mar. 31, 1959 |